(12) United States Patent
Wallerstorfer

(10) Patent No.: US 12,268,978 B2
(45) Date of Patent: Apr. 8, 2025

(54) WATER TANK WITH FILTER CARTRIDGE

(71) Applicant: ACLARIS WATER INNOVATIONS GMBH, LINDAU, ZWEIGNIEDERLASSUNG REBSTEIN, Rebstein (CH)

(72) Inventor: Kurt Wallerstorfer, Strasswalchen (AT)

(73) Assignee: ACLARIS WATER INNOVATIONS GMBH, LINDAU, ZWEIGNIEDERLASSUNG

( * ) Notice: Subject to any disclaimer, the term of this patent is extended or adjusted under 35 U.S.C. 154(b) by 0 days.

(21) Appl. No.: 18/043,839

(22) PCT Filed: Sep. 1, 2021

(86) PCT No.: PCT/EP2021/074146
§ 371 (c)(1),
(2) Date: Mar. 2, 2023

(87) PCT Pub. No.: WO2022/049132
PCT Pub. Date: Mar. 10, 2022

(65) Prior Publication Data
US 2023/0256366 A1 Aug. 17, 2023

(30) Foreign Application Priority Data

Sep. 3, 2020 (DE) .................. 10 2020 123 009.5
Mar. 22, 2021 (DE) .................. 10 2021 107 068.6

(51) Int. Cl.
*B01D 29/96* (2006.01)
*B01D 29/11* (2006.01)
(Continued)

(52) U.S. Cl.
CPC ............ *B01D 29/96* (2013.01); *B01D 29/114* (2013.01); *B01D 35/153* (2013.01); *C02F 1/003* (2013.01);
(Continued)

(58) Field of Classification Search
CPC . B01D 35/147; B01D 35/153; B01D 35/0276
(Continued)

(56) References Cited

U.S. PATENT DOCUMENTS 8,864,866 B2 10/2014 Osendorf et al.
2006/0054547 A1 3/2006 Richmond et al.
(Continued)

FOREIGN PATENT DOCUMENTS

CN 101594922 A 12/2009
CN 105683556 A 6/2016
(Continued)

OTHER PUBLICATIONS

Office Action for Chinese Patent Application No. 2021800747145, dated Nov. 20, 2023, 17 pages including English translation.
(Continued)

*Primary Examiner* — Benjamin M Kurtz
(74) *Attorney, Agent, or Firm* — Christopher J. Volkmann; Kelly Holt and Christenson PLLC

(57) ABSTRACT

A water tank for a domestic appliance, having a tank base, wherein there is provided on the tank base, for the sealed connection of a filter cartridge, an annular tank sealing surface which surrounds a tank passage opening for the flow of water through the wall of the tank base to the domestic appliance, characterized in that a water passage which bypasses the tank sealing surface is provided from outside the tank sealing surface inward to the tank passage opening, which water passage can be closed by a filter-side actuation element upon insertion of the filter cartridge, in that the tank
(Continued)

sealing surface and/or the filter sealing surface of the filter cartridge have a varying radius in relation to a central axis (A), such that the tank sealing surface and/or the filter sealing surface comprise radial indentations and/or radial protuberances.

10 Claims, 15 Drawing Sheets

(51) Int. Cl.
  *B01D 35/153* (2006.01)
  *C02F 1/00* (2023.01)
(52) U.S. Cl.
  CPC ............ *B01D 2201/4023* (2013.01); *B01D 2201/4046* (2013.01); *C02F 2201/006* (2013.01); *C02F 2307/12* (2013.01)
(58) Field of Classification Search
  USPC .................................................. 210/234, 235
  See application file for complete search history.

(56) References Cited

U.S. PATENT DOCUMENTS

| | | | |
|---|---|---|---|
| 2009/0242473 A1 | 10/2009 | Wallerstorfer et al. | |
| 2009/0321342 A1 | 12/2009 | Wawrla et al. | |
| 2010/0025317 A1 | 2/2010 | Fall et al. | |
| 2011/0084016 A1* | 4/2011 | Le Roux ............... | B01D 35/16 210/441 |
| 2012/0223006 A1 | 9/2012 | Sann et al. | |
| 2023/0242416 A1 | 8/2023 | Wallerstorfer | |
| 2023/0256367 A1 | 8/2023 | Wallerstorfer | |
| 2023/0256368 A1 | 8/2023 | Wallerstorfer | |
| 2023/0271116 A1 | 8/2023 | Wallerstorfer | |

FOREIGN PATENT DOCUMENTS

| | | |
|---|---|---|
| DE | 19717054 C2 | 7/1999 |
| DE | 102004049877 A1 | 4/2006 |
| DE | 102006027267 A1 | 1/2007 |
| DE | 102014223648 A1 | 5/2016 |
| DE | 102015007692 A1 | 12/2016 |
| DE | 202017102087 U1 | 7/2018 |
| DE | 112017000784 T5 | 10/2018 |
| EP | 1867606 A1 | 12/2007 |
| EP | 2138078 A1 | 12/2009 |
| EP | 2049218 B1 | 6/2015 |
| EP | 2049220 B1 | 4/2016 |
| EP | 2049221 B1 | 4/2016 |
| EP | 2063972 B1 | 4/2016 |
| EP | 2433906 B1 | 6/2016 |
| RU | 2233607 C2 | 8/2004 |
| RU | 2351271 C2 | 4/2009 |
| RU | 2009108267 A | 9/2010 |
| RU | 2144565 C2 | 2/2011 |
| WO | WO2008017492 A2 | 2/2008 |
| WO | WO2010102690 A1 | 9/2010 |

OTHER PUBLICATIONS

English Translation of the International Preliminary Report on Patentability for International Patent Application No. PCT/EP2021/074146, mailing date of Oct. 21, 2022, 4 pages.
U.S. Appl. No. 18/043,836 Non Final Office Action dated Jul. 18, 2023, 13 pages.
U.S. Appl. No. 18/043,844 Non Final Office Action dated Jun. 23, 2023, 13 pages.
U.S. Appl. No. 18/043,845 Non Final Office Action dated Jul. 13, 2023, 28 pages.
U.S. Appl. No. 18/043,849 Non Final Office Action dated Jun. 22, 2023, 15 pages.
International Search Report and Written Opinion for International Patent Application No. PCT/EP2021/074146, mailing date of Dec. 10, 2021, 16 pages.
Russian Office Action from App. No. 2023108020 (PCT/EP2021/074146), dated Aug. 4, 2023, 12 pages.
First Office Action for German Patent Application No. 102021122574.4, dated Dec. 23, 2023, 14 pages.
International Search Report from App. No. 2023108020 (PCT/EP2021/074146) dated Jul. 20, 2023, 4 pages.

* cited by examiner

WATER TANK WITH FILTER CARTRIDGE

CROSS-REFERENCES TO RELATED APPLICATIONS

This Application is a Section 371 National Stage Application of International Application No. PCT/EP2021/074146, filed Sep. 1, 2021, and published as WO 2022/049132A1 on Mar. 10, 2022, and claims priority to German Application Nos. 10 2021 107 068.6, filed Mar. 22, 2021 and 10 2020 123 009.5 filed Sep. 3, 2020, the contents of each are hereby incorporated by reference in their entirety.

DETAILED DESCRIPTION

Figure 1:
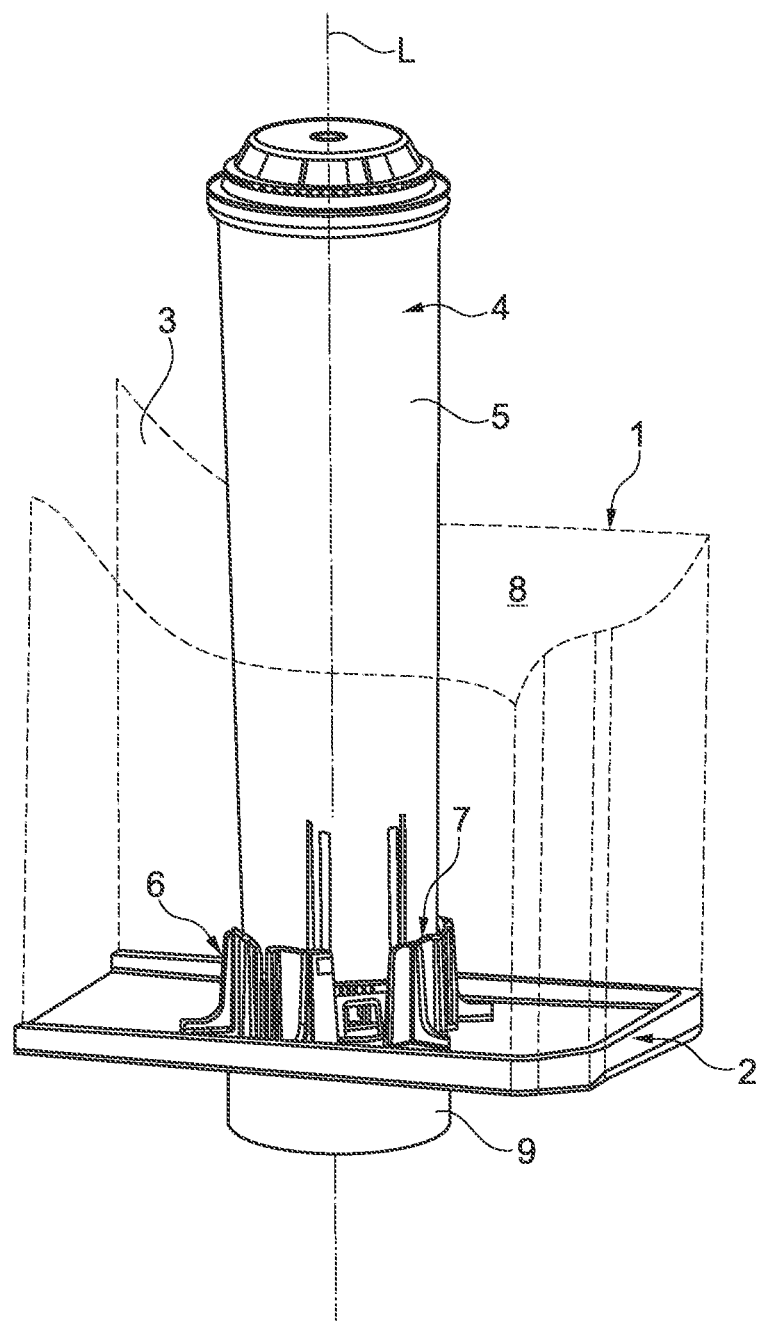
FIG. 1 shows a perspective view of a tank base with an inserted filter cartridge according to the prior art.

The present disclosure relates to a water tank according to the preamble of claim 1.

Filter cartridges are regularly used in water-carrying domestic appliances that have a water tank, in particular in beverage machines such as coffee machines, tea machines, etc., in order to improve the water quality in accordance with the intended use. Filter media for water softening, such as ion exchange resin, or for improving the taste, such as activated carbon, are often used in such filter cartridges. The dosed addition of additives, e.g. for health or for taste improvement, such as the addition of minerals or vitamins, etc., is also already provided in combination with filter media.

Water tanks of such appliances according to the prior art regularly have tank connection elements on the tank base, with an annular tank sealing surface for the sealed connection of a filter connection element of the filter cartridge intended for such a tank, which elements enclose a tank passage opening in the tank base for the water to flow from the filter cartridge and the water tank to the domestic appliance.

Such water tanks and filter cartridges are described, for example, in the publications DE 10 2004 049 877 A1, EP 1 867 606 A1 and DE 197 17 054 C2.

In order to prevent unsuitable filter cartridges from being used, the tank connection elements have already been provided with coding elements so that only filter cartridges that match these coding elements can be used.

The publication US 2006/0054547 A1 discloses a filter having a central standpipe which has a radial opening through which a control valve is opened or closed.

In certain designs, which are disclosed in the publications WO 2008/017492 A2, EP 2 433 906 B1, EP 2 063 972 B1, EP 2 049 220 B1, EP 2 049 221 B1 and EP 2 049 218 B1, a polygonal shape of the seals and tank sealing surfaces has also been used for coding, such that the seal itself also has an additional coding function over and above the sealing function. In one embodiment, a bypass is present whose cross section can be modified by the angle position of the filter cartridge.

These designs have the disadvantage that the angular contour makes it more difficult to implement the sealing function compared to a round contour.

An object of the present disclosure is therefore to propose such a water tank and an alternative filter cartridge, where drawing filtered water from the water tank is possible only with a suitable filter cartridge.

Proceeding from a water tank and a filter cartridge according to the preamble of claim 1, this object is achieved by the characterizing features of the latter.

In the following, elements to be assigned to the water tank are generally preceded by the word "tank", and elements to be assigned to the filter cartridge are generally preceded by the word "filter". Features of advantageous embodiments and developments of the present disclosure are described below such that they are not mandatory but may be present.

A water tank according to one example, having a filter cartridge according to one example, is characterized in that a water passage which bypasses the tank sealing surface is provided from outside the tank sealing surface inward to the tank passage opening, which water passage can be closed by a closure element upon insertion of the filter cartridge. Such a closure element thus represents a coding element for preventing the use of unsuitable filter cartridges. If this water passage is not closed, unfiltered water is passed on, bypassing the filter cartridge. Both the water passage and the associated closure element can be designed differently for different filter cartridges and/or water tanks and can thus be coded differently.

In an advantageous development of the present disclosure, the tank sealing surface has a varying radius along its circumference in relation to a central axis, such that the tank sealing surface comprises radial indentations and/or radial protuberances, wherein the protuberances and/or indentations have a round profile.

A filter-side filter connection piece of corresponding shape can be inserted into such a tank connection element. By virtue of the shape of the alternating circumferential curvatures, the desired sealing effect can be achieved substantially about the entire circumference when the filter connection piece is inserted into the tank connection element with the tank sealing surface pointing radially inward.

The tank sealing surface can be designed matching a filter sealing surface of a filter cartridge, such that the annular tank sealing surface forms an inner surface of a tank connection element, said inner surface pointing toward the central axis of the tank passage opening.

For the use of a filter cartridge in which the indentations and/or protuberances of the filter sealing surface are designed oscillating periodically around a circular line, the indentations and/or protuberances of the tank sealing surface are also designed oscillating periodically around a circular line to match the filter sealing surface.

To adapt to a correspondingly shaped filter sealing surface, six indentations and six protuberances along a circular line with a diameter of less than 3 cm can also be provided on the tank sealing surface.

The annular tank connection element can comprise an annular elastomer seal in which the radial protuberances and/or radial indentations are preformed. Such a tank connection element is advantageous particularly in connection with a filter cartridge whose annular filter connection piece in the region of the filter sealing surface consists of a plastic that is dimensionally stable at the operating temperature. The elastomer seal yields to the dimensionally stable plastic of the filter cartridge during the insertion of the filter cartridge.

The elastomer seal preferably has the tank sealing surface, which seals with respect to the filter cartridge, on the inside of the radial protuberances and/or radial indentations.

Furthermore, it is advantageous if the tank sealing surface of the elastomer seal has an oblique profile leading from the top down toward the central axis. This profile has the effect that the elastomer seal is increasingly elastically deformed outward during the insertion of the filter cartridge, and the resultant restoring force creates a contact pressure that ensures the desired sealing effect.

By deformation of an elastomer seal, one or more further functions can be effected in addition to the fixing function and the sealing function. These can, for example, include a hydraulic function, such as a valve or bypass function for closing or opening the passage according to one example or the like.

For the use of an elastomer seal, it is advantageous if the tank base comprises a fastening ring, and an elastomer seal inserted into the fastening ring. The fastening ring lying to the outside then prevents the elastomer seal from expanding, such that the elastic restoring force of the elastomer is almost completely available for generating the contact pressure.

In order to avoid a flow between the fastening ring and the elastomer seal, the elastomer seal can have a sealing surface for the sealed closure of the elastomer seal with respect to the fastening ring. Furthermore, the elastomer seal can have a sealing surface for the sealed closure of the fastening ring with respect to the tank base.

The water passage according to one example is provided as a bypass channel for unfiltered water in the tank base, which channel runs from the water tank interior through the fastening ring and through the elastomer seal. This allows drainage from the water tank if no filter cartridge is inserted. Such drainage may be required if no filter cartridge is available or if operation without a filter cartridge is required, e.g. in a maintenance operation such as cleaning or descaling of the associated appliance. The cleaning or descaling agents used in such cases should not get into a filter cartridge.

The bypass channel can, for example, comprise an annular gap in the elastomer seal, so that water flows into the outlet line in a manner distributed about the circumference.

The elastomer seal preferably comprises a closure element, by means of which the bypass channel can be closed, in particular by the insertion of the filter cartridge into the elastomer seal. As a result, the bypass can be closed without any further measures when using a suitable filter cartridge.

The elastomer seal can be formed, for example, in such a way that the closure element comprises two opposite annular sealing surfaces in the annular gap, through which the annular gap can be closed upon deformation of the elastomer seal. If the inner sealing surface of the two annular sealing surfaces is widened when a filter cartridge is inserted into the elastomer seal, a form-fit engagement with the outer annular sealing surface is to be effected, with the bypass channel being closed.

To permit simple attachment of the fastening ring and/or of the elastomer seal to the tank base, the fastening ring can comprise a latching element for latching onto the tank base.

Furthermore, a centering element for insertion into the filter cartridge can be provided on the tank base. By means of such a centering element, guiding can take place for inserting a filter cartridge in the correct operating position. In addition, the shape of the centering element can also be used for further coding, in order to ensure that only suitable filter cartridges are used. In addition, such a centering element can also provide a fixing function, for example against twisting or tilting of the filter cartridge. Unintended loosening of the filter cartridge can also be prevented by appropriate friction surfaces, such that a corresponding frictional force has to be overcome when removing the filter cartridge. Additional fixing elements can also be attached to the centering element.

To connect the centering element to the elastomer seal, the centering element can have a base plate which lies in a receptacle in the elastomer seal and engages behind it at the edge. The centering element is thus fastened to the tank base by the elastomer seal.

If a bypass of unfiltered water is provided, the centering element can have, for example in the base plate, a bypass opening which is open toward the central drainage.

The centering element preferably comprises a centering mandrel which protrudes upward from the base plate of the centering element and which has an annular outer surface having a varying radius with respect to the central axis, such that the outer surface comprises radial indentations and/or radial protuberances. Such a centering mandrel is adapted to the outer contour of the elastomer seal and of the filter connection piece of the associated filter cartridge.

In one embodiment of the present disclosure, the indentations and/or protuberances of the outer surface of the centering mandrel are designed oscillating periodically around a circular line. This design corresponds to the shape of a corresponding elastomer seal and thus leaves only an annular gap with the indentations and/or protuberances free for the insertion of a suitable filter cartridge. This configuration thus prevents the use of a connection geometry of a different shape within the elastomer seal and thus improves the coding. In addition, supporting of the filter connection piece can take place on the inside of the filter connection piece, along the protuberances and/or indentations thereof, in order to reliably deform the elastomer seal on the opposite outside when the filter cartridge is inserted.

The indentations and/or protuberances of the outer surface of the centering mandrel can have a round profile in order to adapt to the shape of the elastomer seal and/or of the filter connection piece.

With a corresponding profile of the elastomer seal and/or of the filter connection piece, six indentations and six protuberances along a circular line with a diameter of less than 3 cm are provided in the outer surface of the centering mandrel in order to adapt the latter.

Above the outer surface with the indentations and/or protuberances, in an advantageous embodiment, a step and an inwardly offset projection are provided, the latter being inserted further into the filter cartridge and thus offering a greater axial guide length.

In order to prevent axial sealing on this step by an unsuitable filter cartridge, at least one tooth projecting upward in the continuation of the peripheral surface can be arranged above the annular outer surface.

At least one through-opening leading to the tank passage opening can be provided in the centering element above the annular outer surface, which through-opening connects the water inlet into the filter cartridge to the water outlet and is only closed by a filter cartridge that seals in a manner according to one example.

The axial guiding and centering can be improved by at least one guide rib being provided in the centering element above the annular wall. A flow of water is possible alongside this guide rib or, in the case of multiple guide ribs, between them. These guide ribs can be guided in the abovementioned guide grooves when a filter cartridge is pushed on.

A further guide aid for the centered insertion of the filter cartridge results from the fact that the guide rib or the guide ribs are beveled at the top toward the central axis. The filter connection piece can slide along these bevels when it is pushed on, until it reaches the centered position.

The elastomer seal can also have a sealing surface for the sealed closure of the fastening ring in relation to the tank base, in order to ensure that no unwanted water from the water tank flows past the filter cartridge via the fastening ring.

The fastening ring can also comprise a latching element for latching the fastening ring onto the insert part or the tank base. This facilitates assembly of the fastening ring. If the centering element is also held, as indicated above, by the fastening ring, this simplifies its assembly and, if appropriate, also the assembly of the water tank valve located underneath it.

The design of the water tank is simplified if an insert piece belonging to the tank base is provided on the tank base, which insert piece comprises the parts provided on the water tank for connection of the filter cartridge. With an insert piece, different connection structures can be easily produced with the same water tank design, by using different insert pieces. In addition, different requirements can thus be chosen as regards the manufacturing tolerance of the water tank and of the respective insert piece.

Such an insert piece can advantageously comprise the elastomer seal and/or the fastening ring and/or the centering element and/or at least partially the bypass channel. All the essential tank connection structures can be provided on the insert piece, such that the water tank can be adapted to a specific filter cartridge simply through selection of the appropriate insert piece.

In a water tank according to one example, a filter cartridge is used which is adapted to the tank sealing surface. In such a filter cartridge, the filter sealing surface is developed in such a way that the profile of the filter sealing surface along the circumference of an annular filter connection piece has a varying radius in relation to a central axis, such that the filter sealing surface corresponds to the tank sealing surface in having radial protuberances and/or radial indentations, wherein the protuberances and/or indentations have a round profile, such that corners or edges are avoided. At the same time, the filter connection piece can serve as an actuation element for closing the bypass.

This design of the filter connection piece affords further coding options. The shape of the filter sealing surface matches a corresponding shape of a tank sealing surface, wherein the curvatures alternating from the outside to the inside and vice versa over the profile of the circumference make it more difficult or entirely impossible to clamp or press a shaped seal, which is not adapted in shape, onto or into a fixed tank-side contact surface.

The sealing effect of the filter sealing surface with the tank sealing surface is improved by a round profile of the protuberances and/or indentations, such that corners or edges are avoided. By virtue of the round profile, with avoidance of corners or edges in the region of the sealing surfaces, the sealing function is improved compared, for example, to polygonal shapes as in the prior art. The mechanical clamping and thus the fixing can also be improved by the varying radius, for example compared to a circular shape.

The radial protuberances and/or indentations also simulate the shape of an annular spring, the circumference of which can be expanded or compressed in a resilient manner. The spring effect also improves the sealing effect, since the spring pressure presses the filter sealing surface flat against the associated tank sealing surface. The filter sealing surface and the tank sealing surface can also serve for fixing the filter cartridge and then form a filter fixing surface or a tank fixing surface. This fixing function in the interaction of the filter sealing surface and the tank sealing surface is improved by such a spring effect.

The resilient deformability of the filter sealing surface can be improved by the fact that the annular filter connection piece of the filter connection element that has the filter sealing surface has, in the region of the filter sealing surface, an annular wall with a wall inner side and a wall outer side that run parallel or at an inclination to each other. Depending on whether the connection piece is pushed onto a tank fixing surface or inserted into a tank sealing surface, either the wall outer side or the wall inner side of the annular wall comprises or forms the filter sealing surface.

Since, in this design, the side of the wall opposite the filter sealing surface has the same shape with a correspondingly larger or smaller circumference, this wall is designed overall as an annular spring. The annular wall then forms an annular spring with peripheral sides that are parallel or inclined toward each other.

The annular filter connection piece of the filter connection element, which has the filter sealing surface, can consist, at least in the region of the filter sealing surface, of a plastic that is more dimensionally stable at the operating temperature than an elastomer. On account of this strength, the filter connection piece of the filter cartridge is able, without changing its shape, to exert a contact pressure on a tank-side tank sealing surface in order to establish the sealed connection.

Such a dimensionally stable plastic is stronger than an elastomer, so that an elastomer seal on the water tank side can be deformed with the filter connection piece. A contact pressure can be generated in this way. By deformation of an elastomer seal, it is also possible to provide one or more further functions of the elastomer seal, for example a mechanical or hydraulic function, such as a fixing function, a valve or bypass function or the like.

This is advantageous, for example, when the filter sealing surface forms an outer surface of the annular filter connection piece of the filter connection element, said outer surface pointing away from a central axis of the filter outlet opening. Despite the alternating circumferential curvatures, such a filter connection piece is able to exert an outward contact pressure substantially about the entire circumference when it is inserted into a water tank-side water tank seal with a correspondingly radially inwardly facing tank sealing surface, in order to achieve the desired sealing effect and/or fixing effect.

In a further development of the present disclosure, the arrangement of the protuberances and indentations of the filter sealing surface is rotationally symmetrical about the circumference. This results in a restoring force of the annular spring that is evenly distributed about the circumference, with more stable fixing and sealing of the filter cartridge in the mounted position. A rotationally symmetrical design of the filter sealing surface about the circumference is obtained when the protuberances and/or indentations are designed to oscillate periodically around a circular line. This permits different angular positions of the filter cartridge, making it easier to connect it. Moreover, other technical functions can also be provided depending on the angle.

More stable fixing of the filter cartridge in the installation position is achieved by the fact that the protuberances and indentations of the tank sealing surface and/or of the filter sealing surface are arranged with the same angles about the circumference. The annular spring formed in this way can therefore deform uniformly about the circumference both in the region of the protuberances and in the region of the indentations.

The protuberances and indentations of the filter fixing surface can form a wave shape along a circular line, the wave shape consisting of an alternating sequence of convex circle segments forming the protuberances and of concave circle segments forming the indentations. The profile that follows a circular line results in a radially directed spring effect.

The spring effect of the annular spring can be further improved if the concave and convex circle segments are connected tangentially at turning points at the transition between concave and convex curvatures.

In a specific embodiment of the present disclosure, the arc length of the convex circle segments is longer than the arc length of the concave circle segments. The covered angle of the convex circle segments is therefore greater than the covered angle of the concave circle segments. As a result, the tangential transition between the curvatures runs obliquely in relation to a center circle of the annular spring, such that no radially inwardly or outwardly directed force arises in the transitions during the deformation.

In a specific embodiment, the convex and the concave circle segments have the same segment radius. This results in a comparable force distribution within the segments during the deformation.

The circle segments can be arranged in such a way that the convex and concave circle segments lie within an outer enveloping circle and outside of an inner enveloping circle, wherein the circle center points of the convex circle segments lie inside the inner enveloping circle, and the circle center points of the concave circle centers lie outside the outer enveloping circle. This shape results in a flat profile in relation to the enveloping circles or a center line of segments of a circle running between the enveloping circles, thereby facilitating the expansion or contraction of the annular spring.

A good function has been shown when the radius of the inner enveloping circle is between 5% and 15% of the radius of the outer enveloping circle.

Furthermore, it has proven advantageous if the radius of the convex and/or concave circle segments is between 20% and 35% of the radius of the outer enveloping circle.

The spring effect of such an annular spring is also beneficial if the wall thickness between the wall outer side and the wall inner side, running parallel or inclined thereto, is between 7% and 10% of the radius of the outer enveloping circle.

Moreover, a profile has been shown to be advantageous when the turning points between the curvatures of the concave and convex circle segments are closer to the inner enveloping circle than to the outer enveloping circle.

The filter sealing surface can form an outer surface of the annular filter connection piece of the filter connection element, said outer surface pointing away from a central axis of the filter outlet opening. Despite the alternating circumferential curvatures, such a filter connection piece is capable of exerting a resilient outward contact pressure substantially about the entire circumference when it is inserted into an opening on the water tank side with a correspondingly radially inwardly pointing tank fixing surface, in order to achieve the desired sealing and/or fixing effect. Conversely, when plugged onto a tank connection piece on the water tank side with a correspondingly radially outwardly pointing tank sealing surface, a resilient inward contact pressure can be exerted substantially about the entire circumference by a radially inwardly pointing filter sealing surface, in order to achieve the desired sealing and/or fixing effect.

In a particular embodiment of the present disclosure, a filter fixing surface is provided both on the inside and on the outside of the filter connection piece, one or both of which simultaneously forms a filter sealing surface. Such a filter connection piece can be inserted into an annular slit on the tank side, the side walls of which slit each form a tank fixing surface and/or a tank sealing surface.

A constellation with a very good function has been found to be one in which, for example, six protuberances and six indentations are provided along a circular line that has a diameter of less than 3 cm.

The filter inlet opening of the filter cartridge can be designed as an annular screen opening on the outside of the filter connection piece, whereby the filter cartridge in the water tank is open to the water contained therein.

The filter cartridge is improved if a guide structure for guiding and receiving a centering element on the water tank is provided within the filter connection piece. The filter cartridge can thus be aligned in the axial direction upon insertion into the associated water tank and fixed in this orientation in the operating position.

If the guide structure has at least one guide groove running in the axial direction, i.e. parallel to the central axis, for receiving at least one guide rib of the centering element on the water tank, this guide structure can interact with the associated centering element on the water tank and guide the filter cartridge, with the axial movement upon insertion into the water tank, into at least one angular position and additionally fix it there.

In order to provide guiding and fixing in multiple angular positions, the guide structure can for this purpose have a multiple guide grooves distributed about the circumference.

Good guiding of the filter cartridge into the desired angular position is achieved when the wall of the guide grooves is rounded in such a way that the groove width tapers from the bottom upward in relation to the operating position. The guiding of the filter cartridge can moreover be improved when the walls of the guide grooves are rounded in such a way that the groove width tapers radially from the inside to the outside. The combination of the two tapering groove shapes results in a kind of funnel effect for a rib of a centering element on the water tank that enters such a groove.

The groove shapes mentioned can be formed, for example, by means of inner curvatures in a wall of the guide structure connecting the guide grooves.

The inventive shape of the filter sealing surface can also be used to improve the fixing of the filter cartridge, by means of the filter sealing surface being provided at the same time as a filter fixing surface. The inventive shape of the filter sealing surface provided as a filter fixing surface facilitates a deformation of the filter connection piece in the region of the filter fixing surface, since the radial protuberances and/or indentations form the shape of an annular spring, the circumference of which can be expanded or compressed in a resilient manner. Such a deformation, facilitated by the varying radius, makes it possible to improve the mechanical clamping and thus the fixing, for example in comparison with a circular shape or a polygonal shape.

The resilient deformability of the filter fixing surface can be improved by the fact that the annular filter connection piece of the filter connection element, which has the filter fixing surface, has an annular wall in the region of the filter fixing surface, with a wall inner side and a wall outer side that run parallel or at an inclination to each other. Depending on whether the connection piece is pushed onto a tank fixing surface or inserted into a tank fixing surface, either the inner surface or the outer surface of the annular wall comprises or forms the filter fixing surface.

Since in this embodiment the side of the wall opposite the filter fixing surface has the same shape, with a correspondingly larger or smaller circumference, this wall is designed overall as an annular spring. The annular wall then forms an annular spring with parallel or mutually inclined peripheral sides.

Furthermore, the annular filter connection piece of the filter connection element can have an outer and/or an inner wall which is beveled relative to the vertical, such that the outer wall and the inner wall converge from the top downward in relation to the operating position of the filter cartridge. This results in a guide aid which facilitates the insertion of the connection piece into a gap between two suitably shaped tank-side surfaces, wherein the tank-side surfaces can at least partially form an inner and/or outer tank sealing surface.

Accordingly, the beveled outer wall can have an outer filter sealing surface wall and/or the beveled inner wall can have an inner filter sealing surface, in order to enter into sealing form-fit engagement with the corresponding tank sealing surface.

The water tank, corresponding to the abovementioned filter cartridge, for a domestic appliance has a tank base, wherein an annular tank sealing surface is provided on the tank base for the sealed connection of the filter cartridge, which tank sealing surface encloses a tank passage opening for the water to flow out of the filter cartridge through the wall of the tank base to the domestic appliance. For advantageous interaction with the filter sealing surface described above, the profile of the tank sealing surface also has a varying radius along its circumference relative to a central axis, such that the tank sealing surface comprises radial indentations and/or radial protuberances.

This results in the coding options, indicated above for the filter cartridge, on the part of the water tank. This shape of the tank sealing surface means that a filter cartridge with a corresponding filter sealing surface can be used in the water tank as described above. On account of this shape, the selection of the materials and their arrangement can also be decisive for the adaptation of the filter cartridge and the tank-side connection and can therefore also be part of the coding. In this way, corners or edges in the region of the sealing surfaces can be avoided, which means that the sealing function is improved by comparison with polygonal shapes from the prior art, for example. The mechanical clamping and thus the fixing can also be improved by the varying radius, for example by comparison with a circular shape.

With the mutual adaptations of the shape of the tank sealing surface and of the filter sealing surface, the respective advantages are achieved both on the tank and on the filter cartridge. Thus, a tank filter surface and also the described elastomer seal always have the same shape specification as the filter sealing surface or tank sealing surface described for this purpose.

An exemplary embodiment of the present disclosure is shown in the drawing and is explained in more detail with reference to the following figures.

FIG. 1 illustrates the usual configuration of a water tank 1 of a beverage machine, such as a coffee machine, e.g. a fully automatic coffee machine, according to the prior art. The water tank 1 comprises a tank base 2, and water tank side walls 3 partially illustrated with dashed lines. A filter cartridge 4 with a filter housing 5 is inserted into the water tank 1. The connection between the tank base 2 and the filter cartridge 4 is realized via tank connection elements 6 on the water tank and filter connection elements 7 on the filter.

The filter cartridge 4 is located in the interior 8 of the water tank 1, i.e. during operation it stands completely or partially in the water stored in the water tank 1. A filter connection piece 9 of the water tank 1 for connecting the water tank 1 to the beverage machine (not shown) protrudes from the underside of the water tank 1.

Figure 2:
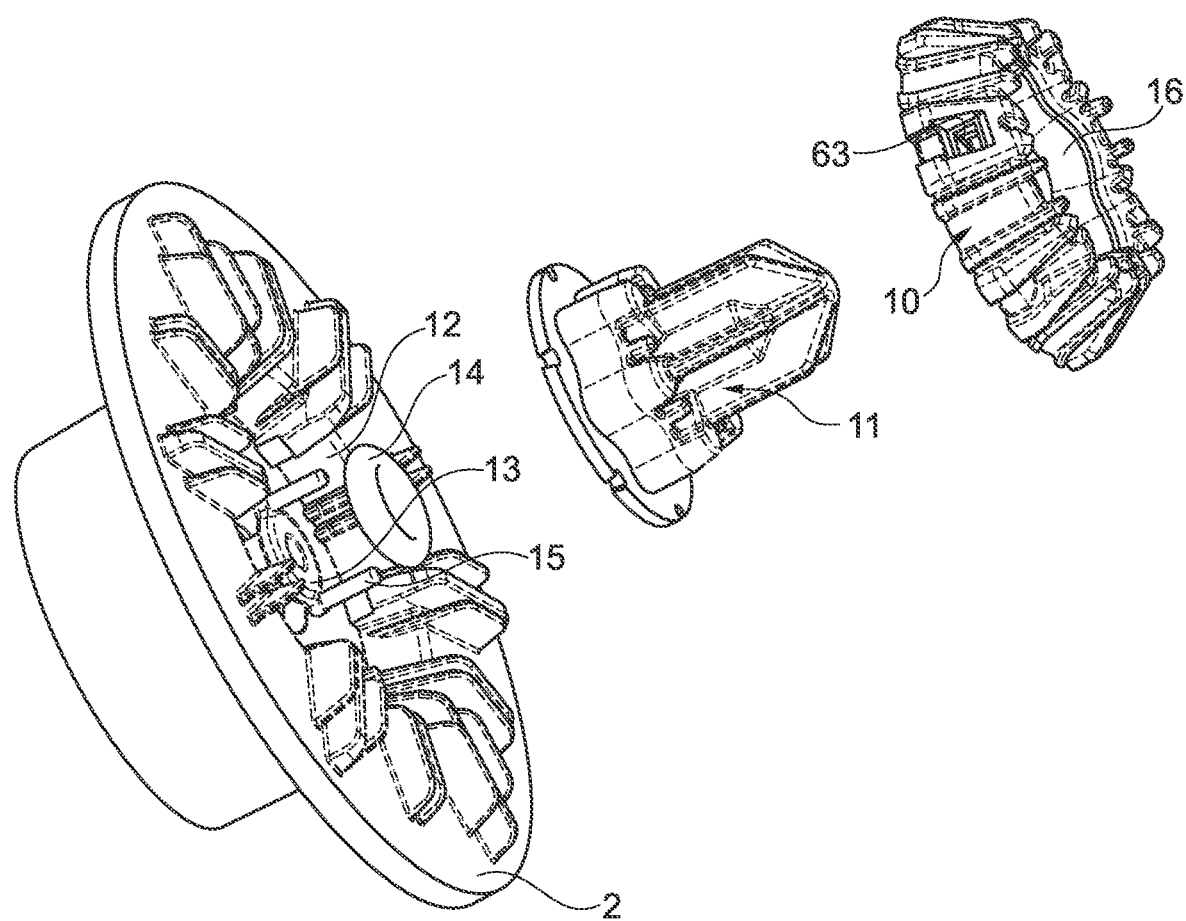
FIG. 2 shows a perspective exploded view of a tank base with centering element and fastening ring, in one example.

FIG. 2 shows a round section of the tank base 2, with a fastening ring 10 and a centering element 11 being provided for placement into a depression 12 in the tank base 2. A tank valve body 13 with a seal 14 designed as an O-ring, from which two pins 15 protrude upward, can likewise be seen in FIG. 2. The fastening ring 10 also carries an elastomer seal 16.

Figure 3:
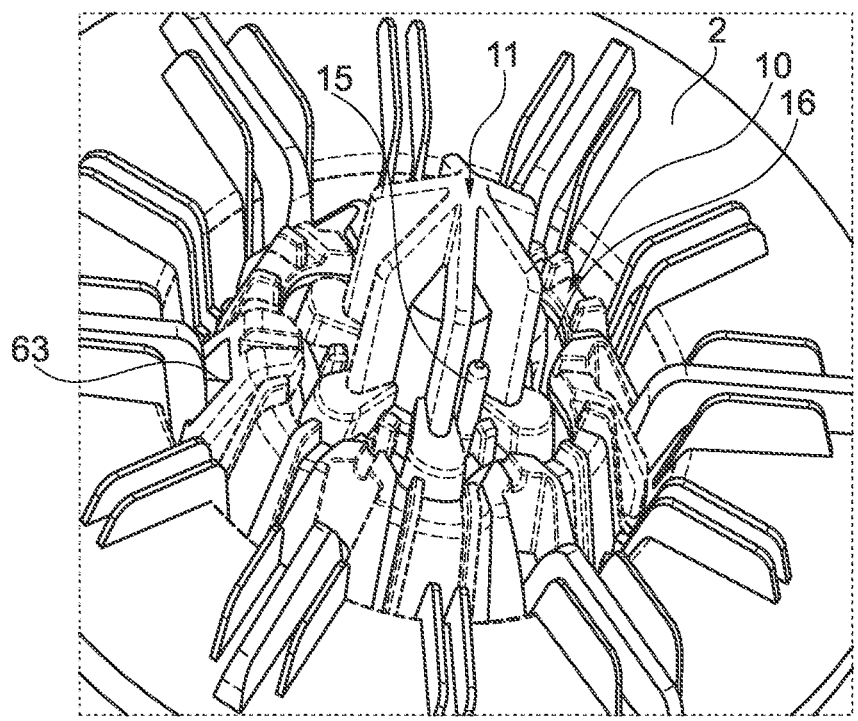
FIG. 3 shows a perspective view of the tank base according to FIG. 2 with built-in centering element and built-in fastening ring, in one example.
Figure 4:
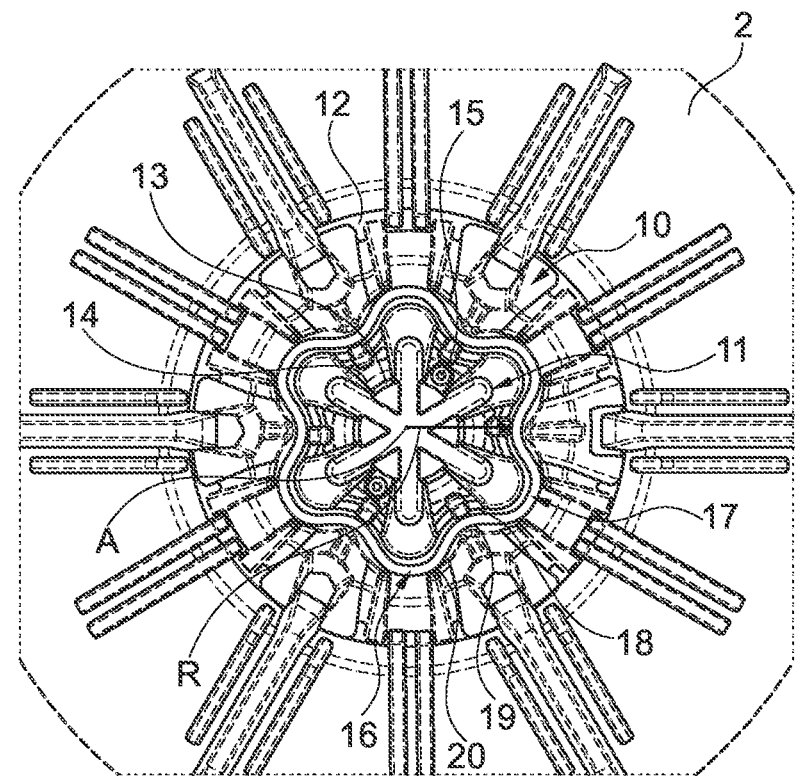
FIG. 4 shows a top view of the tank base according to FIGS. 2 and 3, in one example.

In FIGS. 3 and 4, the fastening ring 10 and the centering element 11 are built into the tank base 2. It can be seen here that the pins 15 can pass through the centering element and thus form coding elements for coding the water tank in relation to the associated appliance connection, from which the tank valve body 13 must be actuated upon insertion of the water tank. In addition, FIG. 4 clearly shows that the elastomer seal 16 forming the water tank seal 17 is an annular seal which has a varying radius R along its circumference relative to a central axis A, such that the inner surface of the water tank seal 17 forming a tank sealing surface 18 comprises radial indentations 19 and radial protuberances 20. The first tank sealing surface 18 also serves as first tank fixing surface.

Figure 5:
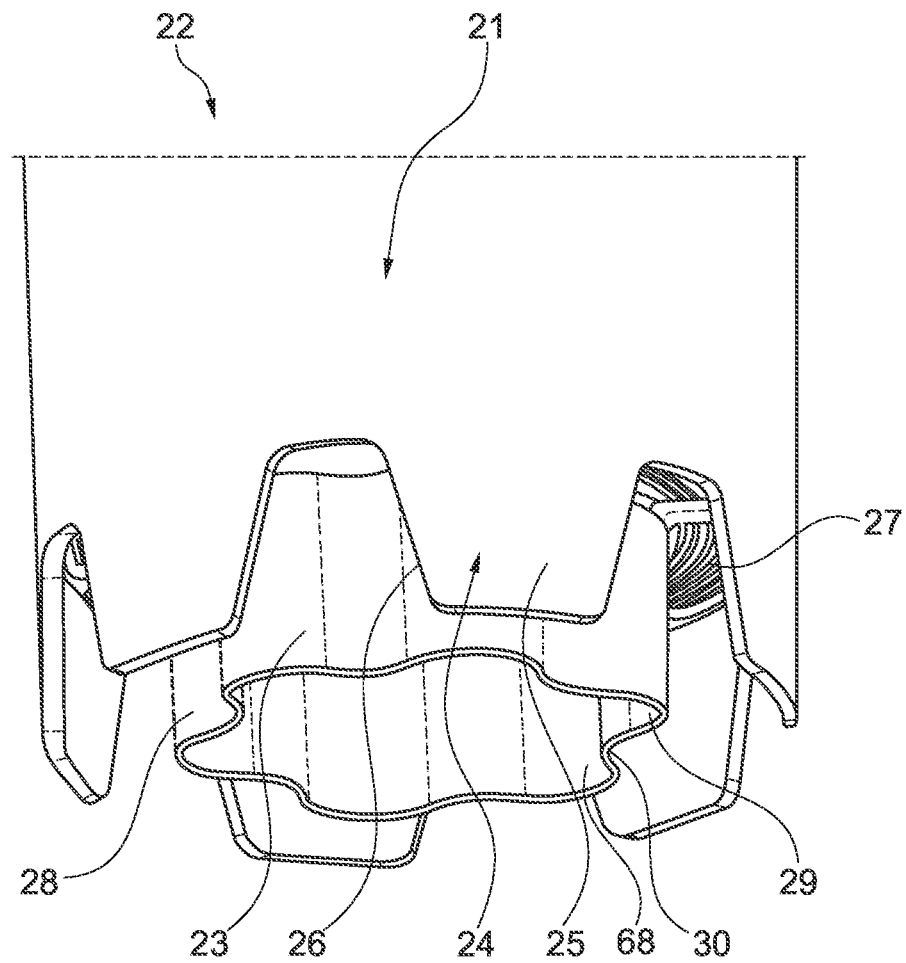
FIG. 5 shows a perspective view of the connection region of the filter cartridge viewed from the side, in one example.

FIG. 5 shows the connection region 21 of a suitable filter cartridge 22. A filter connection piece 23 forms an inner ring surrounded by an outer ring 24 with axially extending projections 25 and recesses 26. Between the inner ring 23 and the outer ring 24 there is an annular inlet screen 27 through which water enters the filter cartridge. The outer surface 28 and the inner surface 68 of the filter connection piece 23 are likewise provided with protuberances 29 and indentations 30 to match the tank sealing surface 18. The outer surface 28 and/or the inner surface 68 of the filter connection piece 23 can also serve as filter fixing surface.

Figure 6:
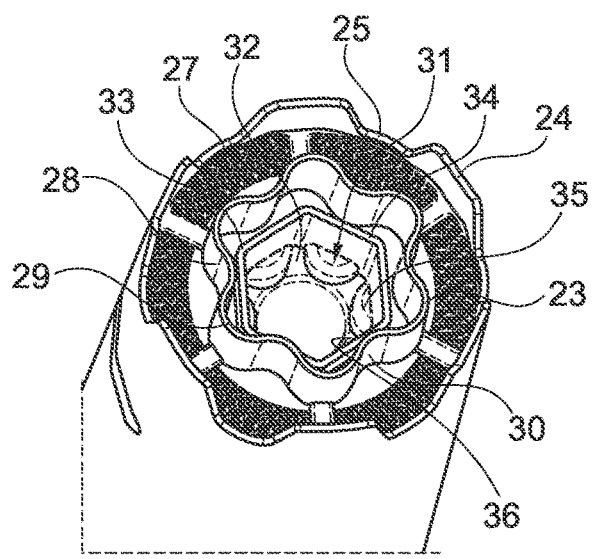
FIG. 6 shows a perspective view of the connection region of the filter cartridge viewed obliquely from below, in one example.
Figure 7:
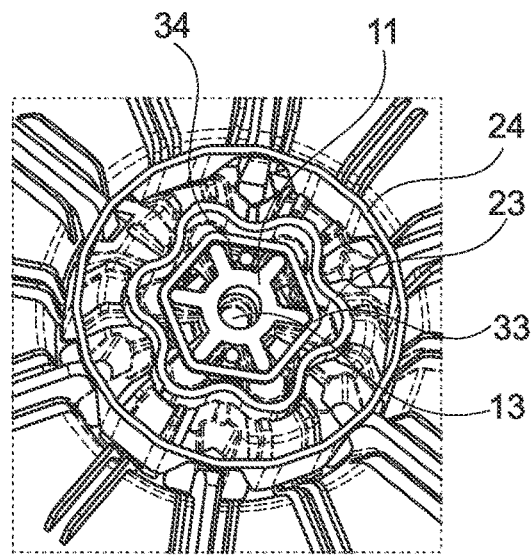
FIG. 7 shows a perspective view of a filter cartridge cut open at the level of the filter connection piece, inserted into a tank base, in one example.

The view in FIG. 6 shows not only the above-described parts of the connection region 21 of the filter cartridge 22 but also the special design of a guide structure 31 of the filter cartridge 22 for receiving the centering element 11. The guide structure has guide grooves 32 which are aligned with the edges 33 of a polygon ring 34, in the present example with six guide grooves which are aligned with six edges of a hexagonal ring. In the sectional view from above according to FIG. 7, the sectional plane runs through this polygon ring 34.

Figure 8:
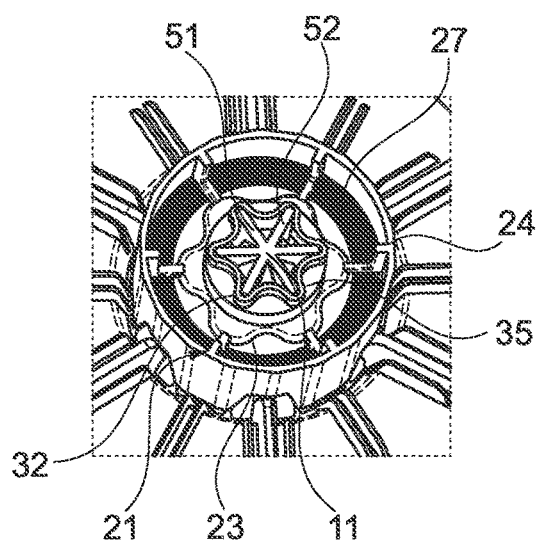
FIG. 8 shows a perspective view of a filter cartridge cut open at the level of the guide grooves, inserted into a tank base, in one example.

Inner curvatures 35 lying between the edges 33 and the guide grooves 32 adjoin upward into the interior of the filter cartridge. The inner curvatures 35 form the lateral walls 36 of the guide grooves 32. On account of this curved shape, the walls 36 of the guide grooves 32 taper both in the axial direction upward (relative to the operating position) and in the radial direction from the inside to the outside. In the interface, viewed from above according to FIG. 8, the sectional plane runs at a level at which the guide grooves 32 are clearly formed. A riser pipe 37 is connected centrally on the inside, through which the water entering the filter cartridge 22 is directed upward to the filter section.

Figure 9:
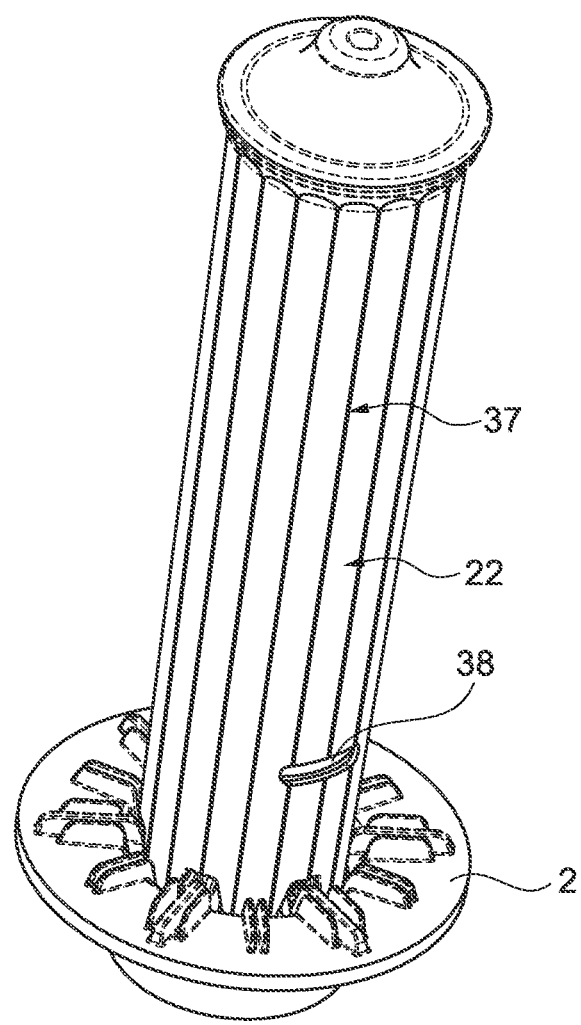
FIG. 9 shows a perspective view of a filter cartridge inserted into a tank base, in one example.

FIG. 9 shows the entire filter cartridge 22. In a filter housing 37 which has an optional lateral dosing opening 38 and the described water connection at the base. The optional dosing opening 38 is provided only in the case where the filter cartridge is designed to discharge additives, e.g. minerals, vitamins or the like, from a dosing chamber, accommodated in the filter housing 37, into the water supply. Since such a dosing chamber is closed within the filter housing 37 with respect to the filter section, it is of no further importance as regards the filtration. A filter cartridge according to one example can thus also be readily constructed without this dosing chamber and its dosing opening 38. FIG. 9 shows in particular the operating position to which the statements above and below in this description relate.

Figure 10:
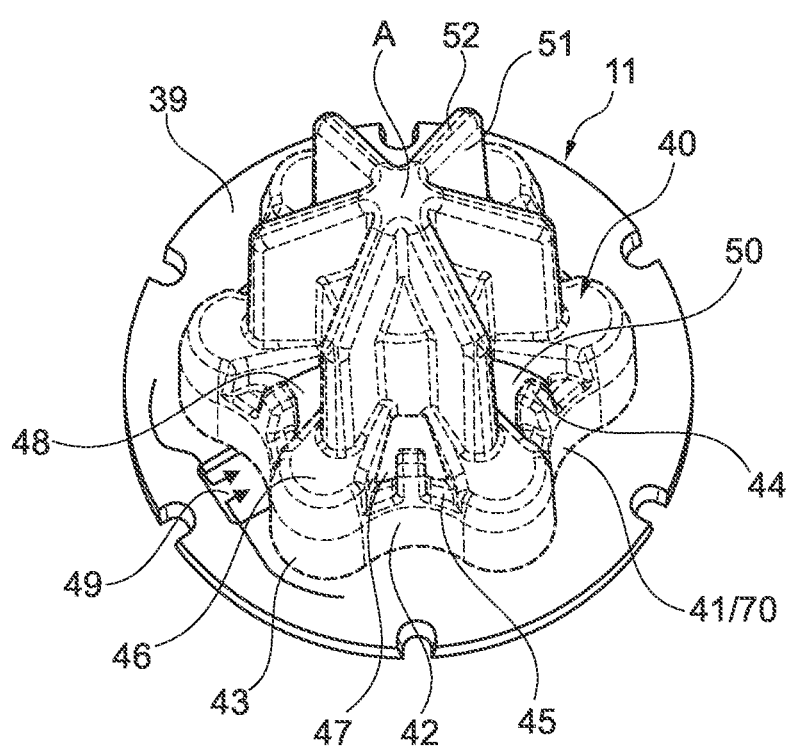
FIG. 10 shows a perspective view of the centering element, in one example.

FIG. 10 shows a perspective view of the centering element 11. The centering element is provided with a base plate 39 which, in the mounted state, lies in a receptacle of the elastomer seal and engages behind it at the edge. A centering mandrel 40 protrudes upward from the base plate 39 and has an annular outer surface 41, which also forms a second tank fixing surface. This outer surface 41 has a radius that varies along the circumference relative to the central axis A, such that this outer surface 41 also comprises radial indentations 42 and protuberances 43. The outer surface 41 is thus adapted to a corresponding shape of the filter connection piece 9.

For further adaptation, the indentations 42 and protuberances 43 of this outer surface 41 are also designed to oscillate periodically around a circular line and have a round profile. In the embodiment shown, six indentations 42 and six protuberances 43 are provided along a circular line with a diameter of less than 3 cm, corresponding to the design of the illustrated embodiment of the filter cartridge 22. With another filter cartridge, the adaptation of the outer surface 41 and/or of the second tank fixing surface is to be modified accordingly.

All adjustments to the outer surface 41 of the centering mandrel 11 have the effect that, in the installed state, only an annular slit between the outer surface 41 and the elastomer seal 16 is open for insertion of the filter connection piece 23. This results in a further coding against the use of an unsuitable filter cartridge. In addition, it is possible in this way to support the inside of the filter connection piece 23 on the outer surface 41 of the centering mandrel 11. In this way, the contact pressure of the filter connection piece on the elastomer seal 16 can be increased uniformly over the varying shape along the entire circumference.

At least one upwardly projecting tooth 44 is provided above the annular outer surface. The one or more teeth 44 are mounted on a step 45 of the centering mandrel 40. Further elevations 46 following the shape of the outer surface 41 opposite the step 45 are attached at a distance from the teeth 44, such that a gap 47 remains between the teeth and the elevations 46. The tooth or teeth 44 and/or the elevations 46 can prevent the use of an axial seal to bypass the coding. Above the outer surface 41 there is also provided a through-opening 48 which, in the mounted state of the centering element 11, leads to a tank through-opening. The filtered water of a filter cartridge 22 can be discharged from the water tank via this through-opening 48.

One or more base through-openings 49 are provided below the outer surface 41 in the base plate 39. Unfiltered water can be conducted out of the water tank through these base openings. Below the elevations 46 and within the wall bearing the outer surface 41, there is a cavity 50 for accommodating the tank valve body 13.

Above the annular outer surface 41, guide ribs 51 are provided which can be beveled on their upper face as in the exemplary embodiment shown. The guide bevels 52 formed in this way help when inserting the guide ribs 51 into the guide grooves 32 of a filter cartridge 22. In the sectional view according to FIG. 4, the guide bevels 52 of the guide ribs 51 in the fitted filter cartridge 22 can be clearly seen.

FIGS. 11, 11a, 11b, 12 and 12a show the assembled components of the water tank 1 for connection of a filter cartridge, with and without filter cartridge 22. The fastening ring 10 is provided with a latching projection 53 with which it can latch onto the tank base 2 by engaging behind a base rib 54 of the water tank. The elastomer seal 16 has a base portion 55 which engages under the fastening ring 10 and thus holds the elastomer seal 16 with the fastening ring 10 on the tank base 2.

For the sealing with respect to the tank base 2, the elastomer seal 16 has a sealing surface which, in the present case, is realized by a sealing bead 56. A circumferential sealing surface can be provided at various points for the sealed closure of the elastomer seal 16 with respect the fastening ring 10. In the exemplary embodiment shown, an annular seal 57 formed integrally on top of the elastomer seal 16 is provided, which forms a seal with the fastening ring in a sealing groove 58 of the latter.

The elastomer seal 16 comprises an outer ring 59 and an inner ring 60, which are molded and bonded to each other in one piece. Along the circumference, the shape of both the outer ring 59 and the inner ring 60 follows the varying radius of the fastening ring 10, the filter connection piece 23, the elastomer seal 16, and the indentations and protuberances formed thereby. The outer ring 59 is stepped and carries the annular seal 57 and the sealing bead 56. The outer ring 59 is moreover provided with one or more bypass openings 61 through which unfiltered water can enter the annular gap 62 between the outer ring 59 and the inner ring 60 in the flow direction P1. In the assembled state, the bypass opening 61 of the elastomer seal 16 directly adjoins a bypass opening 63 in the fastening ring 11, which can also be seen for example in FIGS. 1 and 3. Through the bypass opening 63, unfiltered water can flow from the annular gap 62 out of the water tank 1 into the corresponding beverage machine in the direction P2.

Figure 11:
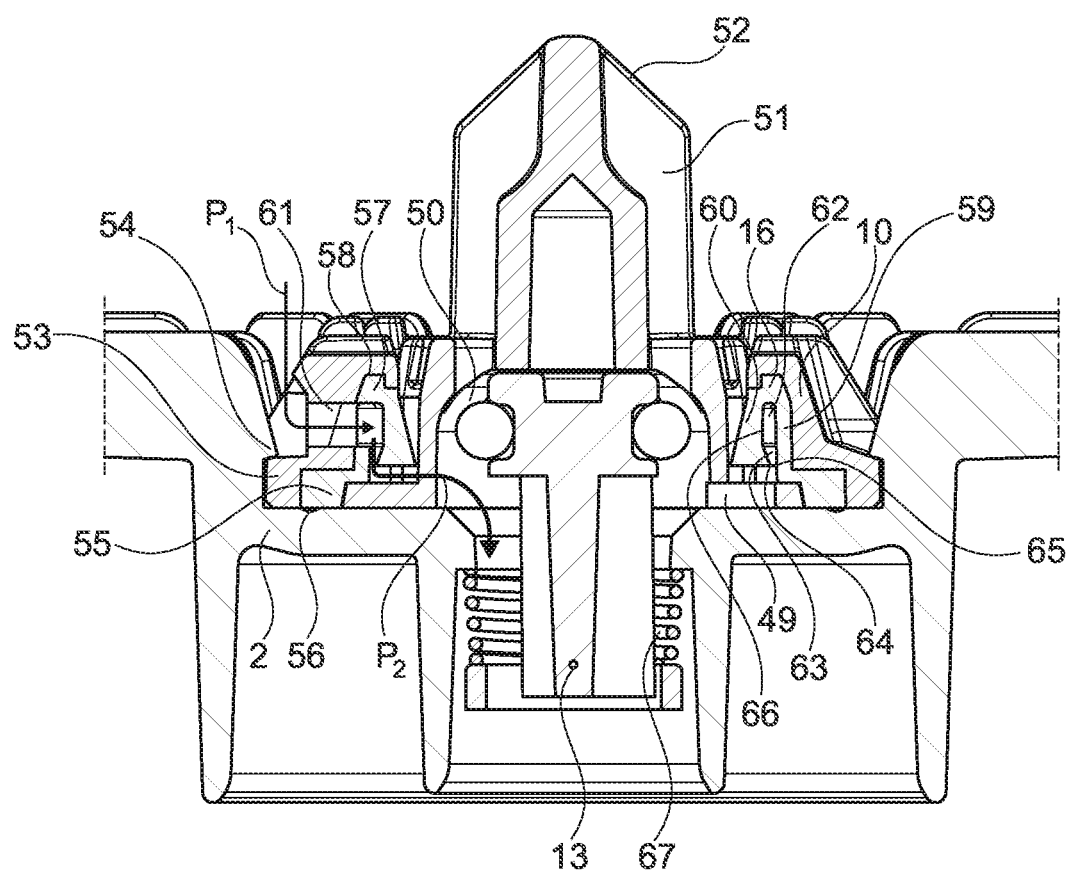
FIG. 11 shows a sectional view of a tank base without a filter cartridge, with the water tank valve opened, in one example.
Figure 11A:
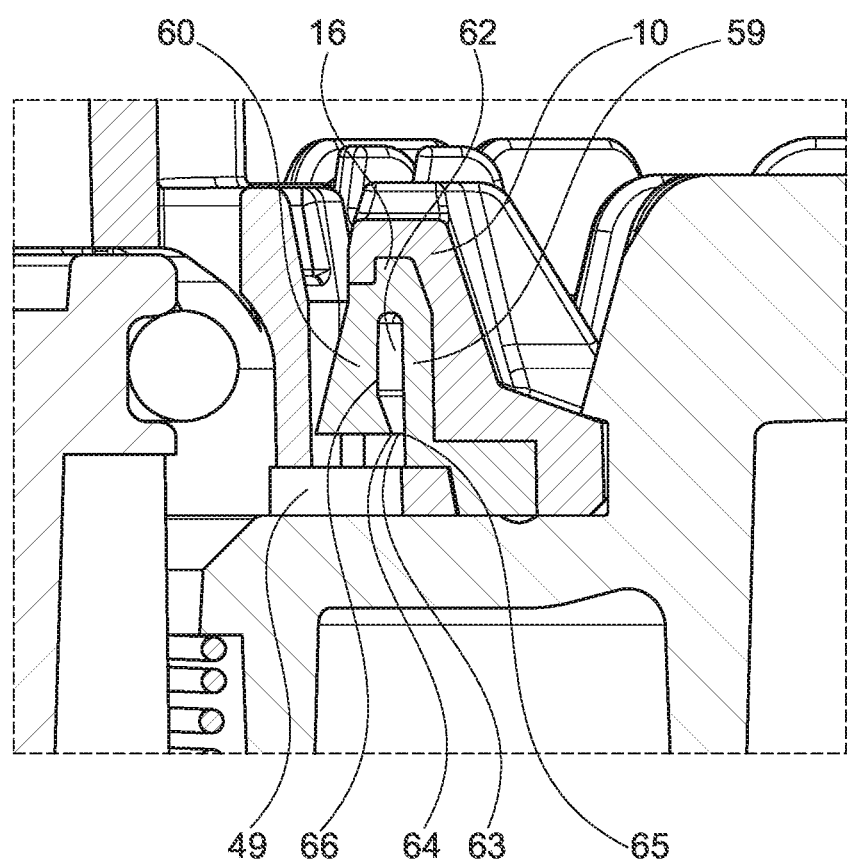
FIGS. 11a and 11b show two detail enlargements from FIG. 11 in order to illustrate a closable bypass line in the tank seal, in one example.
Figure 11B:
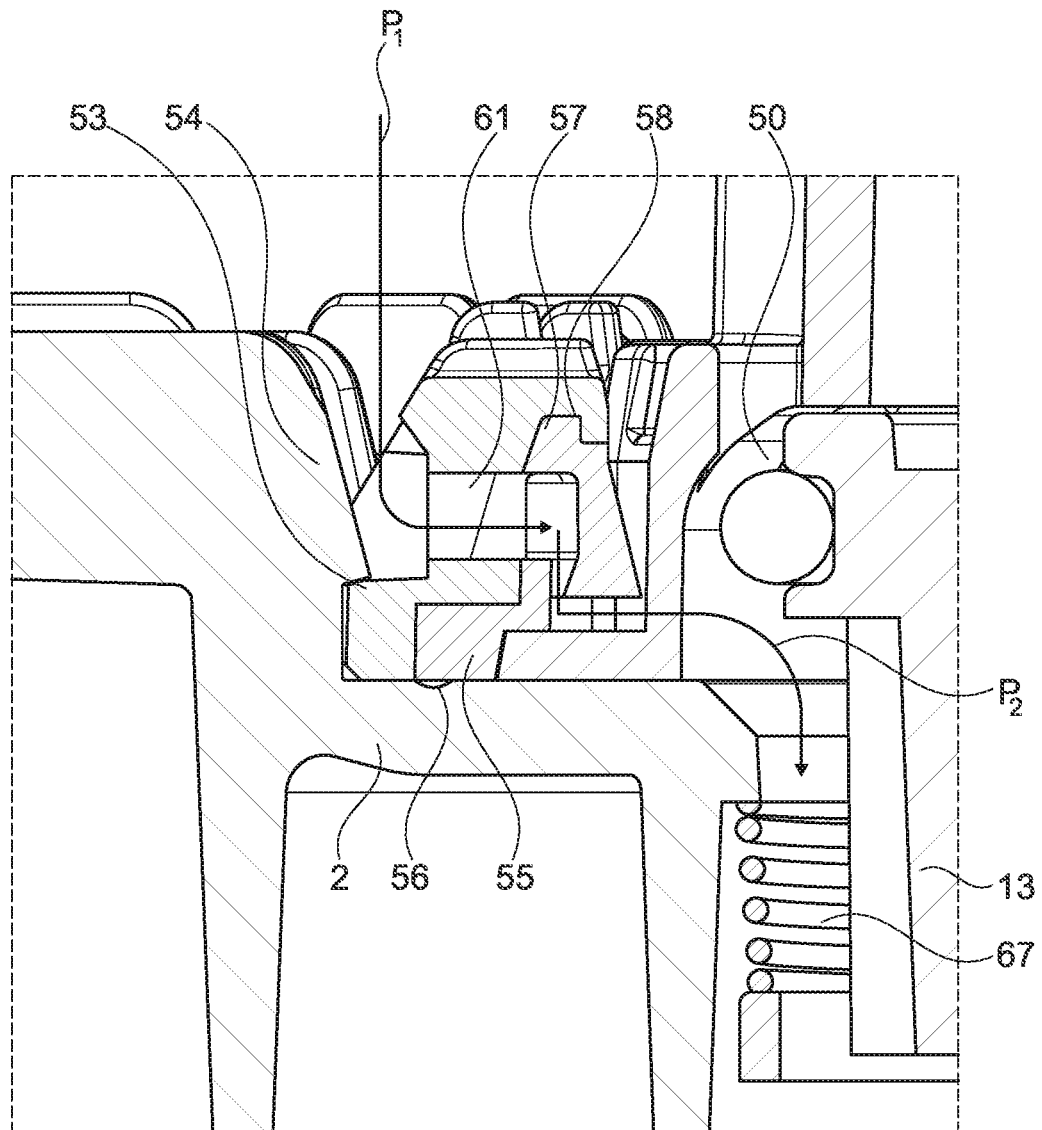

On its underside, the inner ring 60 has a sealing lip 64, which lies opposite a sealing surface 65 on the outer ring 59. In the relaxed state of the elastomer seal 16, the annular gap 62 between the outer ring 59 and the inner ring 60 is open at the bottom, as can be seen in FIG. 11, such that the unfiltered water guided in the bypass can flow out of the annular gap 62 in the flow direction P2. In this state, the inside 66 of the inner ring 60, which forms the water tank seal 17, slants downward and inward in profile. The design of the bypass is highlighted in the enlargements according to FIGS. 11a and 11b.

When a filter cartridge 22 with the filter connection piece 23 is inserted, the elastomer seal 16 is deformed such that the inside 66 is pressed outward and runs substantially perpendicularly along the filter connection piece. In the process, the sealing lip 64 is pressed onto the opposite sealing surface 65, and therefore the annular gap 62 and also the bypass through the bypass openings 61, 63 are closed. The deformation generates a contact pressure that presses the tank sealing surface 17 onto the filter sealing surface 28 and at the same time presses the sealing lip 64 onto the sealing surface 65. This state is shown in FIG. 12 and FIG. 12a.

Figure 12:
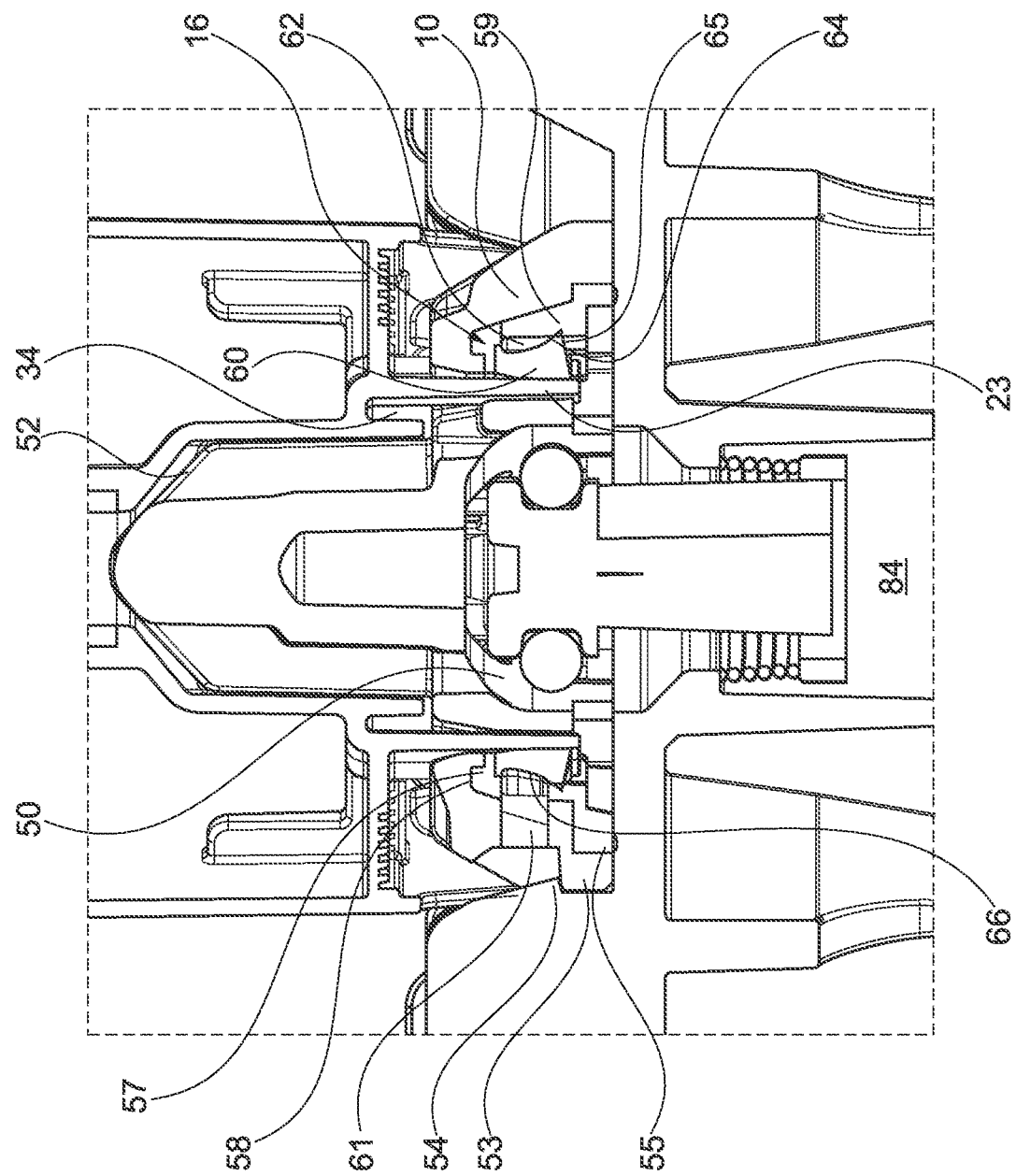
FIG. 12 shows a sectional view of a tank base according to FIG. 11 with an inserted filter cartridge, in one example.
Figure 12A:
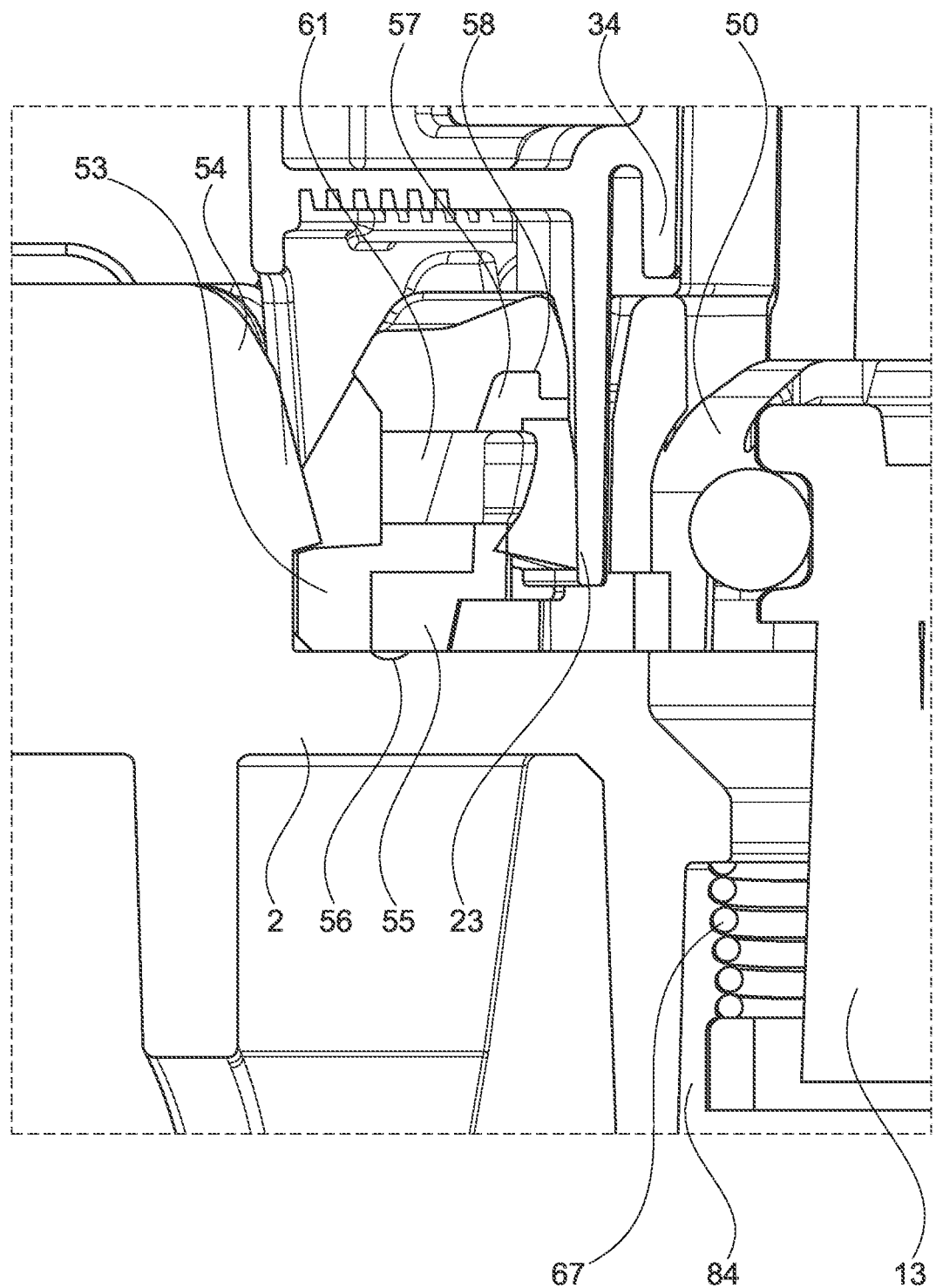
FIG. 12a shows a detail enlargement from FIG. 12 in order to illustrate the closed bypass line, in one example.

The tank valve body 13, both in FIG. 11 and in FIG. 12, is lifted by a stop (not shown in detail) of the associated appliance against a restoring spring 67 into the cavity 50 and is thus in the open position, which corresponds to the water tank inserted. If the water tank is removed from the appliance, the tank valve body 13 closes under the pressure of the restoring spring 67.

The tank sealing surface 18 is formed by the inside 66 of the elastomer seal 16 and at the same time constitutes a first tank fixing surface 18. On this side, as has already been indicated above, a first filter fixing surface 28 formed by the filter sealing surface 28, in the inserted state of the filter cartridge 5, 22, is under a contact pressure that deforms the elastomer seal 16 in such a way that a fixing and sealing form-fit engagement is achieved.

A second filter fixing surface 68 (see FIG. 5), which is formed by the inner surface of the filter connection piece 23, bears on the outer surface 41 forming the second tank fixing surface. This form fit is likewise produced under contact pressure. The shape of the filter connection piece 23 according to one example is such that the latter forms an annular wall 69, which can be expanded in a resilient manner if required. This results in the possibility of tolerance compensation, with good fixing brought about by the corresponding tension. On account of the parallel or mutually inclined shape of the first filter fixing surface 28 and of a second filter fixing surface 68, the annular, undulating wall 69 of the connection piece 23 lying in between forms an undulated annular spring 70. The second filter fixing surface 68 can also act as a second filter sealing surface.

Figure 13:
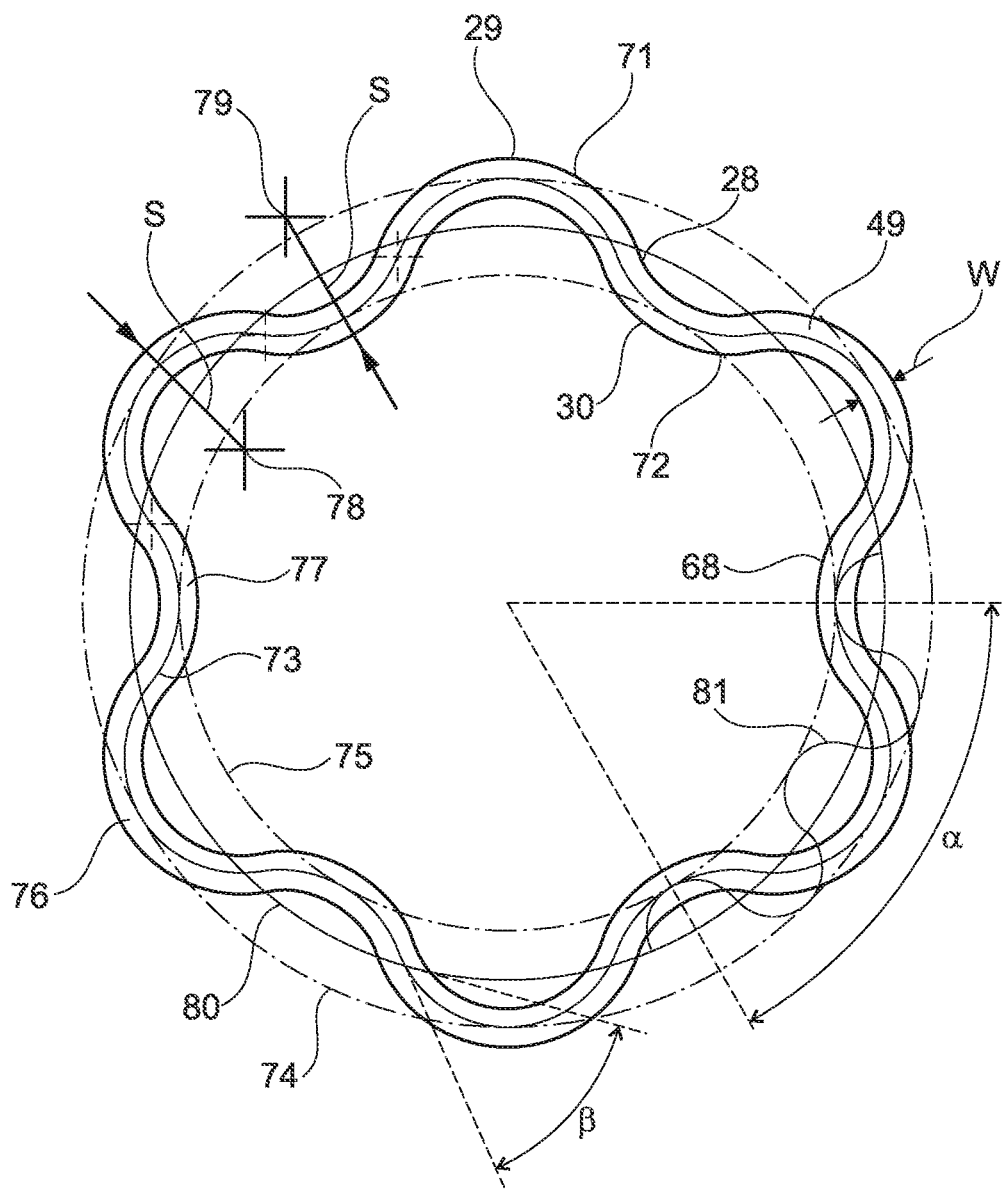
FIG. 13 shows a schematic end view of a filter connection piece, in one example.
Figure 13A:
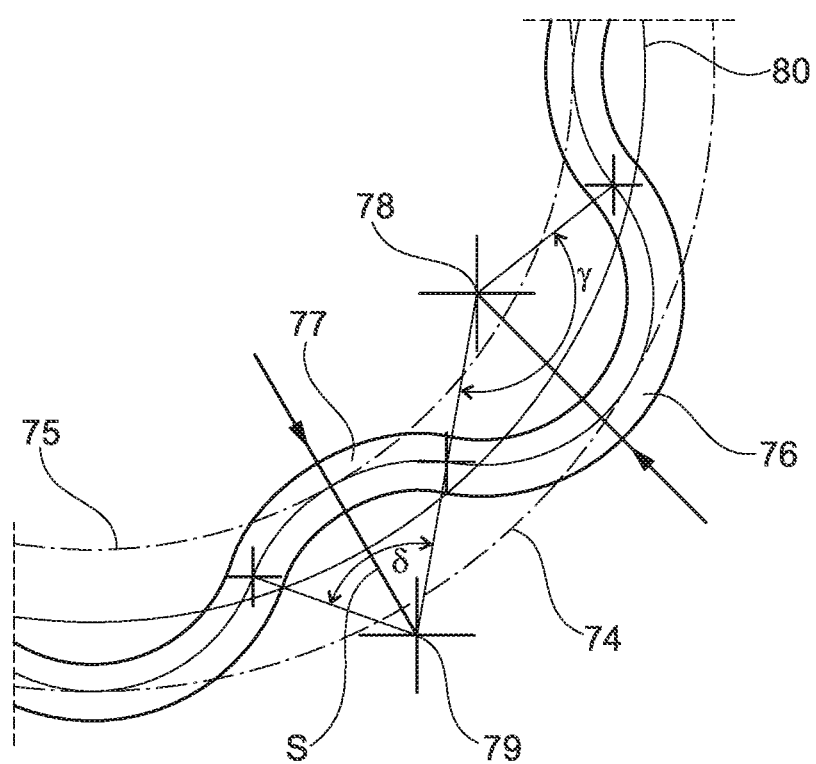
FIG. 13a shows a detail enlargement from FIG. 13, in one example.

The filter connection piece according to the front view in FIG. 13 and according to the detail enlargement in FIG. 13a shows the described undulating shape with protuberances 29 and indentations 30. The annular wall 69 of the filter connection piece 23 with a wall thickness W has the first filter fixing surface 28 on the wall outer side 71 and the second filter fixing surface 68 on the wall inner side 72. The wall outer side 71 and the wall inner side 72 run parallel in the view shown, but are beveled toward each other in the axial direction, as is explained further below. The undulating shape is therefore further illustrated by means of a center line 73 represented by dashed lines.

The center line 73 undulates between an outer enveloping circle 74, whose radius has the largest value of the varying radius, and an inner enveloping circle 75, whose radius has the smallest radius of the varying radius of the undulating shape. The protuberances 29 and indentations 30 of the center line 73 form wave crests in the shape of convex circle segments 76 and wave troughs in the shape of concave circle segments 77. In the embodiment shown, all circle segments 76, 77 have the same segment radius S. The center points 78, 79 of the circle segments 76, 77 lie within the inner enveloping circle 75 for the convex circle segments 76 and outside of the outer enveloping circle 74 for the concave circle segments 77. The convex circle segments 76 and the concave circle segments 77 merge tangentially into one another and are uniformly distributed about the circumference, resulting in a rotationally symmetrical shape. In the exemplary embodiment shown, six convex circle segments 76 and six concave circle segments 77 are provided, which alternate at an angular distance of 30°, i.e. the convex circle segments 76 lie at an angle α of 60° apart from one another, and the concave circle segments 77 likewise.

Through the choice of the segment radius and the associated position of the associated center points 78, 79, the center line runs, with a comparatively shallow curvature, in an undulating manner around the center circle line 80. The center line 73 intersects the center circle line 80 at an obtuse angle β. As a result, the arc length of the protuberances 29 is considerably longer than the arc length of the indentations 30, as a result of which the angle γ covered by the segment arc of the protuberances 29 is considerably greater than the angle δ covered by the indentations 30. This shape improves the spring effect of the filter connection piece 23.

For comparison, the drawing also shows circle segments 81 whose segment center points 82 lie directly on the center line 73. This profile, which is not realized in this embodiment, has considerably smaller segment radii and a profile substantially perpendicular to the center line 73.

A good spring effect has been shown for radii and wall thicknesses in which the radius of the inner enveloping circle 75 is between 5% and 15% of the radius of the outer enveloping circle 74, and the radius of the convex and/or concave circle segments is between 20% and 35% of the radius of the outer enveloping circle 74. The wall thickness W between the wall outer side 71 and the wall inner side 72, running parallel or inclined thereto (relative to the operating position), is preferably between 5% and 15% of the radius of the outer enveloping circle 74.

In the example shown, the outer enveloping circle 74 has a radius of ca. 11 mm, and the inner enveloping circle 75 has a radius of ca. 9.75 mm. The segment radius of the convex and concave circle segments is ca. 3.08 mm, and the wall thickness between the wall outer side 71 and the wall inner side 72, running parallel or inclined thereto, is ca. 0.9 mm.

Figure 14:
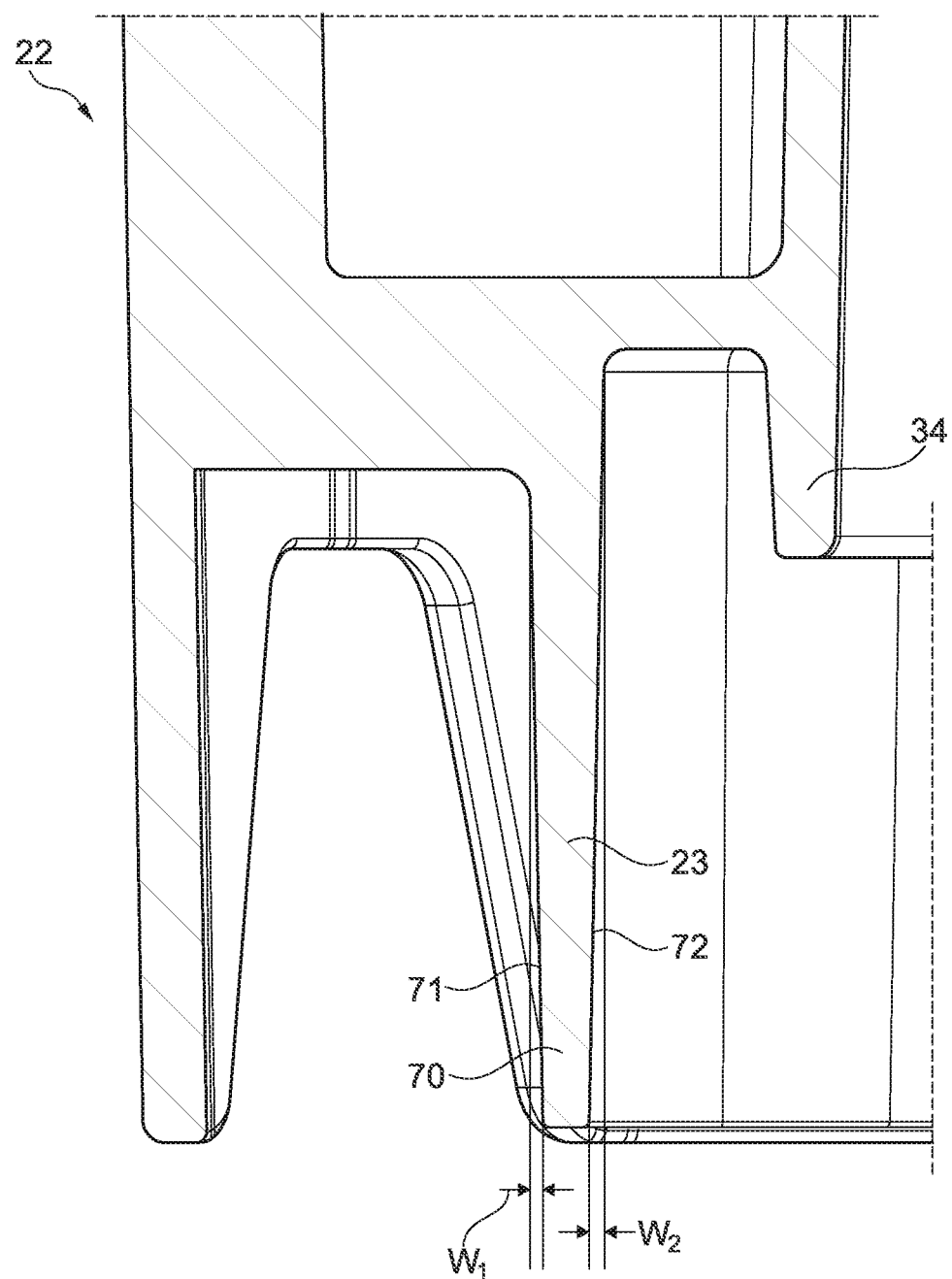
FIG. 14 shows a section of the filter cartridge showing the connection region, in order to illustrate a guide aid by beveling of the connection piece in one example.

It can be seen from FIG. 14 that the outer wall 71 and/or the inner wall 72 of the filter connection piece 23, which depending on the design also form one or two filter sealing surfaces 28, are beveled by the angle $\omega 1$ or $\omega 2$ relative to the vertical, such that they converge from the top downward with respect to the operating position of the filter cartridge 4, 22. This bevel or these bevels around the angles $\omega 1$ and/or $\omega 2$ form an insertion aid when inserting the connection piece 23 into the annular gap between the elastomer seal 16 and the outer surface 41 of water tank 1.

Although the present invention has been described with reference to preferred embodiments, workers skilled in the art will recognize that changes may be made in form and detail without departing from the spirit and scope of the invention.

LIST OF REFERENCE SIGNS 1 water tank
2 tank base
3 water tank side wall
4 filter cartridge
5 filter housing
6 tank connection element
7 filter connection
8 interior
9 filter connection piece
10 fastening ring
11 centering element
12 depression
13 tank valve body
14 seal
15 pin
16 elastomer seal
17 water tank seal/ring seal
18 tank sealing surface
19 indentation
20 protuberance
21 connection region
22 filter cartridge
23 filter connection piece/inner ring
24 outer ring
25 projection
26 recess
27 inlet screen
28 filter sealing surface/outer surface
29 protuberance
30 indentation
31 guide structure
32 guide groove
33 edge
34 polygon ring
35 inner curvature
36 wall
37 filter housing
38 dosing opening
39 base plate
40 centering mandrel
41 outer surface
42 indentation
43 protuberance
44 tooth
45 step
46 elevation
47 gap
48 through-opening
49 base through-opening
50 cavity
51 guide rib
52 guide bevel
53 latching projection
54 base rib
55 base portion
56 sealing bead
57 ring seal
58 sealing groove
59 inner ring
60 outer ring
61 bypass opening
62 ring gap
63 bypass opening
64 sealing lip
65 sealing surface
66 inside
67 restoring spring
68 second filter fixing surface/inner surface
69 wall
70 annular spring
71 wall outer side
72 wall inner side
73 center line
74 outer enveloping circle
75 inner enveloping circle
76 convex circle segment
77 concave circle segment
78 center point
79 center point
80 center circle line
81 circle segment
82 segment center point
83 turning point
84 tank passage opening
A axis
W wall thickness
S segment radius
P1 flow direction
P2 flow direction

The invention claimed is:

1. A water tank for a domestic appliance, the water tank comprising:
a tank base and an annular tank sealing surface on the tank base configured for a sealed connection of a filter cartridge, wherein the annular tank sealing surface surrounds a tank passage opening for a flow of water through a wall of the tank base to the domestic appliance,
a water passage which bypasses the annular tank sealing surface is provided from outside the annular tank sealing surface inward to the tank passage opening, wherein the water passage can be closed by a filter-side actuation element upon insertion of the filter cartridge,
wherein the annular tank sealing surface has a varying radius in relation to a central axis, such that the annular tank sealing surface comprises an annular elastomer seal in which radial indentations and/or radial protuberances having a round profile are preformed,
wherein the water passage which bypasses the annular tank sealing surface, from outside the annular tank sealing surface inward to the tank passage opening, comprises a bypass channel for unfiltered water from the water tank in the tank base and runs from the water tank interior through the annular elastomer seal,
the bypass channel comprises an annular gap in the annular elastomer seal, and
a portion of the annular elastomer seal forms a deformable closure element, wherein deformation of the deformable closure element is configured to close the bypass channel, and wherein the deformable closure element comprises two opposite annular sealing surfaces in the annular gap, through which the annular gap can be closed by deformation of the annular elastomer seal.

2. The water tank as claimed in claim 1, wherein the annular tank sealing surface forms an inner surface of an annular tank connection element, said inner surface pointing toward the central axis of the tank passage opening.

3. The water tank as claimed in claim 1, wherein the radial indentations and/or radial protuberances of the annular tank sealing surface comprise radial indentations and radial protuberances that oscillate periodically around a circular line.

4. The water tank as claimed in claim 1, wherein the annular tank sealing surface is arranged on a radial inner side of the radial indentations and/or radial protuberances of the annular elastomer seal.

5. The water tank as claimed in claim 1, wherein the annular tank sealing surface has an oblique profile leading from a top down toward the central axis.

6. The water tank as claimed in claim 1, wherein at least one annular sealing surface, of two opposite annular sealing surfaces, comprises a profile that slants downward and inward relative to the central axis.

7. The water tank as claimed in claim 6, wherein the profile of the at least one annular sealing surface is increasingly elastically deformed outward during the insertion of the filter cartridge, and a resultant restoring force creates a contact pressure that provides a sealing effect of the annular elastomer seal.

8. The water tank as claimed in claim 1, wherein the annular tank sealing surface is configured to receive a filter sealing surface of the filter cartridge having radial indentations and/or radial protuberances.

9. The water tank as claimed in claim 8, wherein the filter sealing surface forms an outer surface of an annular filter connection piece, said outer surface pointing away from the central axis of a filter outlet opening of the filter cartridge.

10. The water tank as claimed in claim 8, wherein an annular filter connection piece has at least one of an outer wall or an inner wall which, in relation to an operating position of the filter cartridge, slant by an angle $\omega 1$ and/or $\omega 2$ relative to vertical, such that the outer wall and the inner wall converge from a top downward.

* * * * *